United States Patent
Westervelt et al.

(10) Patent No.: US 11,946,378 B2
(45) Date of Patent: Apr. 2, 2024

(54) TRANSIENT CONTROL OF A THERMAL TRANSPORT BUS

(71) Applicant: General Electric Company, Schenectady, NY (US)

(72) Inventors: Eric R. Westervelt, Niskayuna, NY (US); Stefan Joseph Cafaro, Chapel Hill, NC (US); James R. Reepmeyer, Montgomery, OH (US); Terry Hei Tsun Ma, Madison, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/719,379

(22) Filed: Apr. 13, 2022

(65) Prior Publication Data

US 2023/0332510 A1   Oct. 19, 2023

(51) Int. Cl.
*F02C 7/18* (2006.01)
*F01D 17/08* (2006.01)
(Continued)

(52) U.S. Cl.
CPC ......... *F01D 21/003* (2013.01); *F01D 17/085* (2013.01); *F02C 7/141* (2013.01);
(Continued)

(58) Field of Classification Search
CPC .. F02C 7/141; F02C 7/185; F02C 9/52; F02C 7/222; F02C 7/224; F02C 7/228;
(Continued)

(56) References Cited

U.S. PATENT DOCUMENTS

| 3,039,305 A | 6/1962 | Hall |
| 4,505,124 A | 3/1985 | Mayer |

(Continued)

FOREIGN PATENT DOCUMENTS

| CA | 885178 | 11/1971 |
| CN | 1627063 | 6/2005 |

(Continued)

OTHER PUBLICATIONS

French Application No. FR2112278, Filed Nov. 19, 2021, Title: Module for Assembling a Fan Blade of a Turbomachine, (Ref. B-024469).

(Continued)

*Primary Examiner* — Todd E Manahan
*Assistant Examiner* — Rodolphe Andre Chabreyrie
(74) *Attorney, Agent, or Firm* — Fitch, Even, Tabin & Flannery, LLP

(57) ABSTRACT

A method of transient control of a thermal transport bus of a turbomachine includes measuring a measured temperature and a measured pressure of a working fluid; determining a selected run state of a turbomachine, wherein the selected run state is one of a plurality of run states; selecting a desired operating condition comprising a desired temperature range and a desired pressure range as a function of a desired state of the working fluid; comparing the measured temperature with the desired temperature range, and comparing the measured pressure with the desired pressure range; and modulating control of the thermal transport bus as a function of the comparing of the measured temperature with the desired temperature range and the comparing of the measured pressure with the desired pressure range.

20 Claims, 8 Drawing Sheets

(51) Int. Cl.
  *F01D 21/00* (2006.01)
  *F02C 7/141* (2006.01)
  *F02C 9/28* (2006.01)

(52) U.S. Cl.
  CPC .............. *F02C 7/185* (2013.01); *F02C 9/28* (2013.01); *F05D 2220/323* (2013.01); *F05D 2260/213* (2013.01); *F05D 2260/606* (2013.01); *F05D 2260/80* (2013.01); *F05D 2260/83* (2013.01)

(58) Field of Classification Search
  CPC .. F02C 7/232; F02C 7/236; F02C 9/28; F02C 7/22; F02C 7/30; F23D 2900/00016; F23N 5/203; F23N 1/002; F01D 21/003; F01D 17/085; F05D 2220/323; F05D 2260/213; F05D 2260/606; F05D 2260/80; F05D 2260/83
  See application file for complete search history.

(56) References Cited

U.S. PATENT DOCUMENTS

| | | | |
|---|---|---|---|
| 4,756,854 | A | 7/1988 | Wegrzyn |
| 4,784,959 | A | 11/1988 | Wegrzyn |
| 4,822,743 | A | 4/1989 | Wegrzyn |
| 4,844,743 | A | 7/1989 | Koblenzer |
| 5,809,771 | A | 9/1998 | Wernberg |
| 6,116,016 | A | 9/2000 | Wada et al. |
| 6,182,435 | B1 | 2/2001 | Niggemann et al. |
| 6,415,595 | B1 | 7/2002 | Wilmot, Jr. et al. |
| 6,877,306 | B2 | 4/2005 | Wernberg et al. |
| 6,959,535 | B2 | 11/2005 | Mancini et al. |
| 6,984,465 | B2 | 1/2006 | Canepa |
| 7,096,667 | B2 | 8/2006 | Laster et al. |
| 7,192,459 | B2 | 3/2007 | Puri |
| 7,752,885 | B2 | 7/2010 | Huang |
| 7,811,688 | B2 | 10/2010 | Flynn |
| 7,915,047 | B2 | 3/2011 | Thorn |
| 8,113,708 | B2 | 2/2012 | Albertson |
| 8,319,833 | B2 | 11/2012 | Weinstein |
| 8,340,886 | B2 | 12/2012 | Nenmeni et al. |
| 8,387,400 | B2 | 3/2013 | Goeke et al. |
| 8,394,553 | B2 | 3/2013 | Flynn |
| 8,470,933 | B2 | 6/2013 | Thorn |
| 8,499,822 | B2 | 8/2013 | Bulin et al. |
| 8,639,480 | B2 | 1/2014 | Arnold et al. |
| 8,720,206 | B2 | 5/2014 | McMahan et al. |
| 8,778,545 | B2 | 7/2014 | Lehar |
| 8,858,679 | B2 | 10/2014 | Buhrman |
| 9,022,730 | B2 | 5/2015 | Vysohlid et al. |
| 9,038,397 | B2 | 5/2015 | Papa et al. |
| 9,239,008 | B2 | 1/2016 | Ekanayake |
| 9,249,729 | B2 | 2/2016 | Bacic |
| 9,269,205 | B1 | 2/2016 | Lamkin et al. |
| 9,318,757 | B2 | 4/2016 | Koenig |
| 9,561,856 | B2 | 2/2017 | Mevenkamp |
| 9,638,422 | B2 | 5/2017 | Hall et al. |
| 9,650,955 | B2 | 5/2017 | Sabelhaus et al. |
| 9,650,960 | B2 | 5/2017 | Vertenoeuil et al. |
| 9,683,910 | B2 | 6/2017 | Ekanayake |
| 10,107,200 | B2 | 10/2018 | Miller et al. |
| 10,112,486 | B2 | 10/2018 | Ban |
| 10,222,291 | B2 | 3/2019 | Thompson |
| 10,233,841 | B2 | 3/2019 | Bintz et al. |
| 10,260,419 | B2 | 4/2019 | Cerny et al. |
| 10,286,336 | B2 | 5/2019 | Durward |
| 10,286,408 | B2 | 5/2019 | Lam |
| 10,344,673 | B2 | 7/2019 | Rambo |
| 10,364,750 | B2 | 7/2019 | Rambo |
| 10,386,259 | B2 | 8/2019 | Zhang |
| 10,473,031 | B2 | 11/2019 | Ellsworth |
| 10,578,585 | B1 | 3/2020 | Gerardi |
| 10,584,616 | B2 | 3/2020 | Moxon |
| 10,584,635 | B2 | 3/2020 | Armstrong et al. |
| 10,823,066 | B2 | 11/2020 | Miller |
| 11,073,169 | B2 | 7/2021 | Thatte |
| 11,125,165 | B2 | 9/2021 | Niergarth |
| 11,139,491 | B2 | 10/2021 | Kwon |
| 11,143,104 | B2 | 10/2021 | Pal et al. |
| 11,261,792 | B2 | 3/2022 | Niergarth |
| 11,261,803 | B2 | 3/2022 | McCambridge |
| 11,359,554 | B2 | 6/2022 | Patel |
| 11,761,344 | B1 | 9/2023 | Miller |
| 2006/0257094 | A1 | 11/2006 | McEvoy |
| 2008/0154474 | A1 | 6/2008 | Iasillo et al. |
| 2010/0212857 | A1 | 8/2010 | Bulin et al. |
| 2012/0019254 | A1 | 1/2012 | Zhang |
| 2012/0026483 | A1 | 2/2012 | Messerchmidt |
| 2012/0192542 | A1 | 8/2012 | Chillar et al. |
| 2013/0045449 | A1 | 2/2013 | Thatcher et al. |
| 2013/0139897 | A1 | 6/2013 | Kim |
| 2015/0059353 | A1 | 3/2015 | Asai et al. |
| 2015/0101419 | A1 | 4/2015 | Hill |
| 2015/0118014 | A1 | 4/2015 | Elward et al. |
| 2015/0321767 | A1 | 11/2015 | Kamath et al. |
| 2016/0076461 | A1 | 3/2016 | Kawai et al. |
| 2016/0356224 | A1 | 12/2016 | Farnum |
| 2017/0167382 | A1 | 6/2017 | Miller |
| 2017/0217592 | A1 | 8/2017 | Hinderliter |
| 2018/0050811 | A1 | 2/2018 | Niergarth |
| 2019/0003386 | A1 | 1/2019 | Stapp |
| 2019/0153952 | A1* | 5/2019 | Niergarth .................. F02C 7/14 |
| 2019/0203645 | A1 | 7/2019 | Kleckler et al. |
| 2019/0218971 | A1 | 7/2019 | Niergarth |
| 2019/0277201 | A1* | 9/2019 | Veilleux, Jr. ........... B64D 37/32 |
| 2020/0197834 | A1 | 6/2020 | Ding |
| 2020/0340881 | A1 | 10/2020 | Hattori |
| 2020/0348662 | A1 | 11/2020 | Cella |
| 2021/0148283 | A1 | 5/2021 | Niergarth et al. |
| 2021/0172375 | A1* | 6/2021 | Bosak .................. F04B 49/007 |
| 2021/0277796 | A1 | 9/2021 | McCambridge et al. |
| 2021/0277838 | A1 | 9/2021 | Patel et al. |
| 2023/0279784 | A1 | 9/2023 | Sibbach |
| 2023/0279817 | A1 | 9/2023 | Sibbach |

FOREIGN PATENT DOCUMENTS

| | | |
|---|---|---|
| CN | 200990131 | 12/2007 |
| DE | 102009031663 | 4/2010 |
| EP | 0527629 | 2/1993 |
| EP | 2559884 | 2/2013 |
| EP | 3124770 | 2/2017 |
| EP | 3199456 | 8/2017 |
| EP | 2535644 | 12/2019 |
| EP | 3805107 | 4/2021 |
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| JP | 2014025741 | 2/2014 |
| WO | 2011119338 | 9/2011 |

(56) References Cited

FOREIGN PATENT DOCUMENTS

OTHER PUBLICATIONS

French Application No. FR2109526, Filed Sep. 10, 2021, Title: Flexibilities in a geared gas turbine engine, (Ref. B-024242).
French Application No. FR2109530, Filed Sep. 10, 2021, Title: Flexibilities in a geared gas turbine engine, (Ref. B-024243).
French Application No. FR2109787, Filed Sep. 17, 2021, Title: Aircraft Turbine Engine With an Off-Axis Propeller, (Ref. B-024794).
French Application No. FR2112280, Filed Nov. 19, 2021, Title: Assembly With Variable Setting for a Fan of a Turbomachine, (Ref. B-024468).
French Application No. FR2112486, Filed Nov. 25, 2021, Title: Electric Energy Conversion and Transport System for the Internal Hybridization of an Aircraft Turbo-Engine, (Ref. B-025286).
French Application No. FR2112509, Filed Nov. 25, 2021, Title: Device for Pressurizing a Turbomachine Enclosure With a Curvic Coupling Passage, and Corresponding Turbomachine, (Ref. B-0250350).
French Application No. FR2112705, Filed Nov. 30, 2021, Title: Turbomachine Comprising a Lubrication Enclosure and a Speed Reducer, (Ref. B-024542).
French Application No. FR2112869, Filed Dec. 2, 2021, Title: Turbine engine comprising an electric machine downstream from a turbine shaft and driven by this shaft, (Ref. B-025037).
French Application No. FR2113100, Filed Dec. 7, 2021, Title: Cooling-air distribution case, (Ref. B-024474).
French Application No. FR2113361, Filed Dec. 13, 2021, Title: Turbomachine for an Aircraft Comprising an Electric Machine, (Ref. B-025039).
French Application No. FR2113552, Filed Dec. 15, 2021, Title: Method for managing the torque of a turbomachine, (Ref. B-025059).
French Application No. FR2113845, Filed Dec. 17, 2021, Title: Aircraft Turbomachine, (Ref. B-025396).
French Application No. FR2113847, Filed Dec. 17, 2021, Title: Aircraft Turbomachine, (Ref. B-025189).
French Application No. FR2113949, Filed Dec. 20, 2021, Title: Turbomachine Module Equipped With a Pitch Change System and a Fluid Transfer Device, (Ref. B-024662).
French Application No. FR2113951, Filed Dec. 20, 2021, Title: Turbomachine Module Equipped With Variable Pitch Vanes and an Annular Interface Shroud, (Ref. B-023792).
French Application No. FR2113952, Filed Dec. 20, 2021, Title: Turbomachine Module Equipped With Variable Pitch Vanes and Oil Transfer Device, (Ref. B-023793).
French Application No. FR2113953, Filed Dec. 20, 2021, Title: Turbomachine Module Equipped With a Pitch Change System and a Fluid Transfer Device With Blind Sleeving, (Ref. B-024657).
French Application No. FR2113966, Filed Dec. 20, 2021, Title: Fluid Transfer Device With Hydraulic and Mechanical Connection Means, (Ref. B-024661).
French Application No. FR2114236, Filed Dec. 22, 2021, Title: Turbine Engine Subassembly Including a Gooseneck With an Improved Configuration and Turbine Engine Including a Subassembly of This Type (Ref. B-024601).
French Application No. FR2114272, Filed Dec. 22, 2021, Title: Aircraft Turbine Engine Comprising Blade Pitch Control Using Local Pressure Measurements, (Ref. B-024494).
French Application No. FR2200883, Filed Feb. 1, 2022, Title: Method for managing the torque of a turbomachine, (Ref. B-025105).
French Application No. FR2201260, Filed Feb. 14, 2022, Title: Propulsion unit for aircraft comprising a gas turbine engine and an electrical machine mounted in an enclosure with a cooling system comprising a main coupling member, method for using such a unit, (Ref. B-025173).

French Application No. FR2201266, Filed Feb. 14, 2022, Title: Gas turbine engine assembly comprising a housing with half-shells bearing variable pitch inlet stator vanes, (Ref. B-024190).
French Application No. FR2202171, Filed Mar. 11, 2022, Title: Propulsion System for an Aircraft, (Ref. B-025595).
French Application No. FR2202172, Filed Mar. 11, 2022, Title: Aeronautical Thruster, (Ref. B-025596).
https://web.archive.org/web/20090612100519/https://en.wikipedia.org/wiki/Hagen%E2%80%93Poiseuille_equation. 2009 (1 pg.).
U.S. Appl. No. 17/687,960, filed Mar. 7, 2022, entitled "Pericritical Fluid Systems for Turbine Engines".
U.S. Appl. No. 17/687,976, filed Mar. 7, 2022, entitled "Liquid Fluid Systems for Turbine Engines".
U.S. Appl. No. 17/724,074, filed Apr. 19, 2022, entitled "Thermal Management System".
U.S. Appl. No. 17/872,241, filed Jul. 25, 2022, entitled "Systems and Methods for Controlling Fuel Coke Formation".
U.S. Appl. No. 17/872,241; Non-Final Office Action dated May 8, 2023; (pp. 16).
Drafts, Acoustic Wave Technology Sensors, Fierce Electronics, Oct. 2000, 17 Pages.
Fandino et al., Phase Behavior of (CO2 + H2) and (CO2+ N2) at Temperatures Between (218.15 and 303.15) Kat Pressures up to 15 MPa, International Journal of Greenhouse Gas Control, vol. 36, May 2015, 39 Pages.
Fehrm, Bjorn's Corner: The Challenges of Hydrogen. Part 29. Gas Turbine Heat Management, Mar. 19, 2021, 3 Pages. Accessed on-line at: https://leehamnews.com/2021/03/19/bjorns~corner~the~challengs~of~hydrogen~part~29~gas~turbine~heat~management/.
Gonzalez-Portillo, A New Concept in Thermal Engineering Optimization: The Pericritical Cycle with Multi-Heating and Its Application to Concentrating Solar Power, Sep. 2019, 233 Pages. (Abstract Only) Retrieved Mar. 7, 2022 from Weblink: https://oa.upm.es/56492/.
Goos et al., Phase Diagrams of CO2 and CO2—N2 Gas Mixtures and Their Application in Compression Processes, Energy Procedia, vol. 4, 2011, pp. 3778-3785.
Javed et al., Thermodynamic Speed of Sound Data for Liquid and Supercritical Alcohols, Journal of Chemical & Engineering Data, vol. 64, No. 3, 2019, pp. 1035-1044.
Ke et al., Detecting Phase Transitions in Supercritical Mixtures: An Enabling Tool for Greener Chemical Reactions, Proceedings of the Royal Society A, vol. 466, 2010, pp. 2799-2812.
Ke et al., The Phase Equilibrium and Density Studies of the Ternary Mixtures of CO2+ Ar+ N2 and CO2 + Ar+ H2, Systems Relevance to CCS Technology, International Journal of Greenhouse Gas Control, vol. 56, Jan. 2017, pp. 55-56.
Legoix et al., Phase Equilibria of the CH4—CO2 Binary and the CH4—CO2—H2O Ternary Mixtures in the Presence of a CO2-Rich Liquid Phase, 10122034, Energies, vol. 10, 2017, 11 Pages.
Oag et al., Probing the Vapor-Liquid Phase Behaviors of Near-Critical and Supercritical Fluids Using a Shear Mode Piezoelectric Sensor, Analytical Chemistry, vol. 75, No. 3, Feb. 1, 2003, p. 479-485.
Park et al., Measurements of Density and Sound Speed in Mixtures Relevant to Supercritical CO2 Cycles, Journal of Energy Resources Technology, vol. 142, Oct. 2020, 7 Pages.
U.S. Appl. No. 17/687,960; Notice of Allowance dated Jun. 28, 2023; (pp. 9).
Wetenhall et al., The Effect of CO2 Purity on the Development of Pipeline Networks for Carbon Capture and Storage Schemes, International Journal of Greenhouse Gas Control, vol. 30, 2014, pp. 197-211.
USPTO; U.S. Appl. No. 17/872,241; Notice of Allowance dated Nov. 24, 2023; (pp. 8).

\* cited by examiner

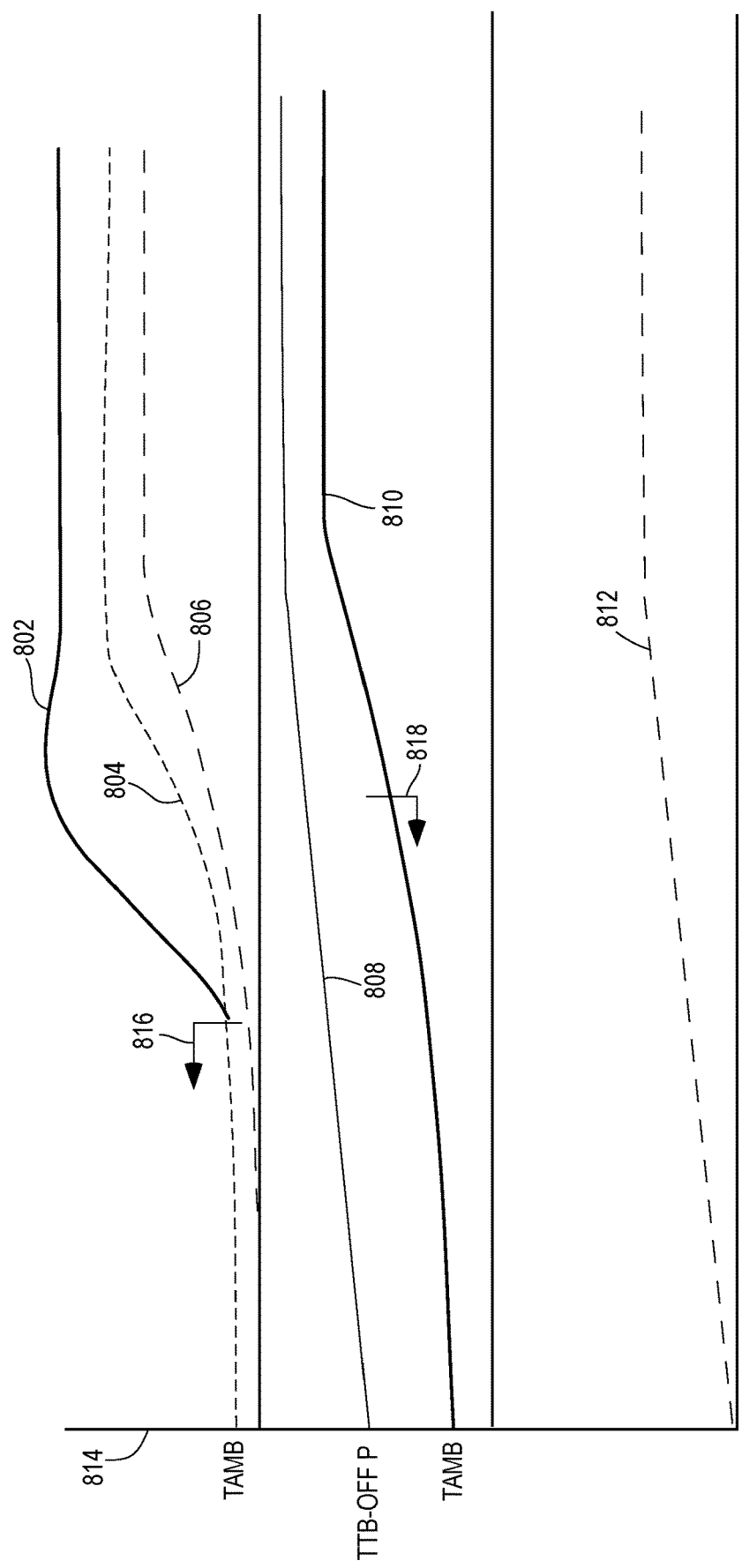

TRANSIENT CONTROL OF A THERMAL TRANSPORT BUS

TECHNICAL FIELD

These teachings relate generally to turbomachines and more particularly to thermal transport buses of a turbomachine.

BACKGROUND

A gas turbine engine generally includes a fan and a core arranged in flow communication with one another. Various accessory systems are included to ensure that the fan and/or core operate as desired. For example, a main lubrication system provides lubrication to, e.g., bearings and gear meshes within a compressor section, a turbine section, and a power gear box (if provided). In addition to the lubricating properties provided to such components, the main lubrication system removes heat from such components such that they may operate within a desired temperature range.

Other accessory systems of the gas turbine engine, such as an environmental control system, also require heat removal during operation. Accordingly, gas turbine engines typically include numerous heat exchangers, each heat exchanger dedicated to an individual accessory system of the gas turbine engine. At least certain of these individual accessory systems of the gas turbine engine require a maximum heat removal at potentially different stages of the gas turbine engine run cycle.

BRIEF DESCRIPTION OF THE DRAWINGS

Various needs are at least partially met through provision of the TRANSIENT CONTROL OF A THERMAL TRANSPORT BUS described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 8 comprises a graphical representation of temperature over time in accordance with variations of the present disclosure.

Figure 1:
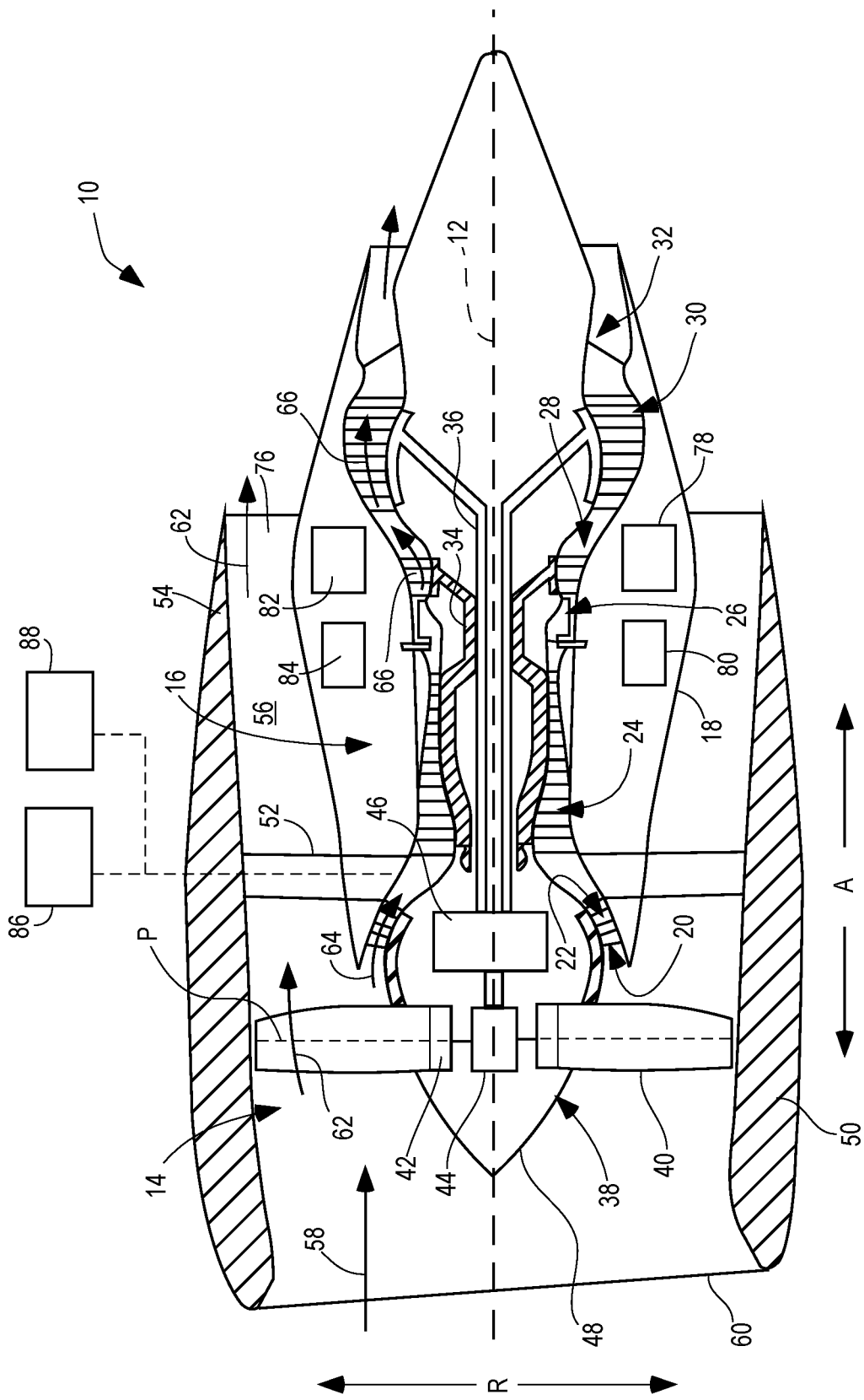
FIG. 1 is a schematic, cross-sectional view of a gas turbine engine in accordance the present disclosure.

Elements in the figures are illustrated for simplicity and clarity and have not necessarily been drawn to scale. For example, the dimensions and/or relative positioning of some of the elements in the figures may be exaggerated relative to other elements to help to improve understanding of variations of the present disclosure. Also, common but well-understood elements that are useful or necessary in a commercially feasible embodiment are often not depicted in order to facilitate a less obstructed view of these variations of the present disclosure. Certain actions and/or steps may be described or depicted in a particular order of occurrence while those skilled in the art will understand that such specificity with respect to sequence is not actually required.

DETAILED DESCRIPTION

Heretofore, the thermal transport bus of a turbomachine operates to maintain the properties of a working fluid in a desirable condition. However, this operation can be compromised, for example, during engine starting, throttle push to takeoff, and during a throttle chop. As a result, large transients in temperature, pressure, or flow rate may be observed in the working fluid, causing the thermal transport bus to react to these changes, potentially compromising operation of the thermal transport bus or the turbomachine itself, for example, when the transient condition terminates.

In the case where the working fluid is carbon dioxide ($CO_2$), the desired operation of the system is to keep the $CO_2$ either gaseous or, preferably, supercritical.

These are all significant challenges in the context of aviation application settings.

Generally speaking, the various aspects of the present disclosure can be employed with a method of transient control of a thermal transport bus of a turbomachine including providing the thermal transport bus coupled to the turbomachine, wherein the thermal transport bus comprises a working fluid; measuring a measured temperature and a measured pressure of the working fluid at at least one point on the thermal transport bus; determining a selected run state of the turbomachine, wherein the selected run state is one of a plurality of run states; selecting a desired operating condition comprising a desired temperature range and a desired pressure range as a function of a desired state of the working fluid; comparing the measured temperature with the desired temperature range, and comparing the measured pressure with the desired pressure range; and modulating control of the thermal transport bus as a function of the comparing of the measured temperature with the desired temperature range and the comparing of the measured pressure with the desired pressure range.

In variations, method includes selecting the desired operating condition as a function of a desired state of the working fluid and the selected run state.

In other variations, the method may also, alternatively, modulate control of the turbomachine itself as a function comparing of the measured temperature with the desired temperature range and comparing of the measured pressure with the desired pressure range.

Various other aspects of the present disclosure can be employed with a system of transient control of a thermal transport bus of a turbomachine including the thermal transport bus, wherein the thermal transport bus comprises a working fluid; a temperature sensor comprising a temperature output signal; a pressure sensor comprising a pressure output signal; a selected run state input comprising a selected run state signal, wherein a selected run state is one of a plurality of run states; a desired operating condition input comprising a desired temperature range signal and a desired pressure range signal selected as a function of a desired state of the working fluid; and a processor generating a thermal transport bus control signal. The processor generates the thermal transport bus control signal by performing the following steps: comparing the temperature output signal with the desired temperature range signal, and comparing the pressure output signal with the desired pressure range signal; and generating the thermal transport bus control signal as a function of the comparing of the temperature output signal with the desired temperature range signal and the comparing of the pressure output signal with the desired pressure range signal.

In one variation, the desired operating condition input is a function of a desired state of the working fluid and the selected run state.

In other variations, the system may also, or alternatively, include the processor generating the thermal transport control bus control signal and a turbomachine control signal by performing the following steps: generating the turbomachine control signal as a function of the comparing of the temperature output signal with the desired temperature range signal and the comparing of the pressure output signal with the desired pressure range signal.

The working fluid properties are assured through coordinated control of, for example, the working fluid pump speed, pump inlet guide vanes (IGVs) orientations, and bypass valves.

The present teachings of coordinated control can also be used to protect fuel state (for example, to avoid coking, or to avoid multiple phases of fuel, e.g., liquid and gas, in the fuel pump simultaneously).

The present teachings of coordinated control can respect operating temperature limits for the working fluid.

The present teachings of coordinated control may leverage known physics of the particular thermal transport bus to protect, via models or designed limits, working fluid states throughout the system, even in areas where, for example, temperature or pressure are not directly measured.

The present teachings of coordinated control may be used to regulate working fluid state to protect hardware components (e.g., damage to pump with two-phase flow) and avoid exceeding temperature limits.

Aspects and advantages of the disclosure will be set forth in part in the following description, or may be obvious from the description, or may be learned through practice of the disclosure.

In one exemplary embodiment of the present disclosure, a thermal management system for incorporation at least partially into at least one of a gas turbine engine or an aircraft is provided. The thermal management system includes a thermal transport bus having a heat exchange fluid flowing therethrough and a pump for generating a flow of the heat exchange fluid in the thermal transport bus. The thermal management system also includes a plurality of heat source exchangers in thermal communication with the heat exchange fluid in the thermal transport bus. The plurality of heat source exchangers are arranged along the thermal transport bus. The thermal management system also includes at least one heat sink exchanger permanently or selectively in thermal communication with the heat exchange fluid in the thermal transport bus at a location downstream of the plurality of heat source exchangers.

In another exemplary embodiment of the present disclosure, a gas turbine engine is provided. The gas turbine engine includes a compressor section coupled to a turbine section by one or more shafts and a main lubrication system for providing lubrication to one or more components located in at least one of the compressor section or the turbine section. The gas turbine engine also includes a thermal management system having a thermal transport bus having a heat exchange fluid flowing therethrough and a plurality of heat source exchangers in thermal communication with the heat exchange fluid in the thermal transport bus. The plurality of heat source exchangers are arranged along the thermal transport bus and include a heat exchanger for transferring heat from the main lubrication system to the heat exchange fluid in the thermal transport bus. The thermal management system also includes at least one heat sink exchanger permanently or selectively in thermal communication with the heat exchange fluid in the thermal transport bus at a location downstream of the plurality of heat source exchangers.

Referring now to the drawings, wherein identical numerals indicate the same elements throughout the figures, FIG. 1 is a schematic, cross-sectional view of a turbomachine more specifically a gas turbine engine, in accordance with an exemplary embodiment of the present disclosure. More particularly, for the embodiment of FIG. 1, the gas turbine engine is a high-bypass turbofan jet engine 10, referred to herein as "turbofan jet engine 10" or "turbomachine 10" As shown in FIG. 1, the turbofan jet engine 10 defines an axial direction A (extending parallel to a longitudinal centerline 12 provided for reference) and a radial direction R. In general, the turbofan jet engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the high pressure turbine 28 to the high pressure compressor 24. A low pressure (LP) shaft or spool 36 drivingly connects the low pressure turbine 30 to the low pressure compressor 22.

For the embodiment depicted in the example of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by low pressure spool 36 across a power gear box 46. The power gear box 46 includes a plurality of gears for stepping down the rotational speed of the low pressure spool 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 so as to define a bypass airflow passage 56 therebetween.

During operation of the turbofan jet engine 10, a volume of air 58 enters the turbofan jet engine 10 through an associated inlet 60 of the outer nacelle 50 and/or fan section 14. As the volume of air 58 passes across the fan blades 40, a first portion 62 of the air 58 as indicated by arrow 62 is directed or routed into the bypass airflow passage 56 and a second portion 64 of the air 58 as indicated by arrow 64 is directed or routed into the low pressure compressor 22. The ratio between the first portion 62 of air 58 and the second portion 64 of air 58 is commonly known as a bypass ratio. The pressure of the second portion 64 of air 58 is then increased as it is routed through the high pressure (HP) compressor 24 and into the combustion section 26, where it is mixed with fuel and burned to provide combustion gases 66. Subsequently, the combustion gases 66 are routed through the high pressure turbine 28 and the low pressure turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before the first portion 62 is exhausted from a fan nozzle exhaust section 76 of the turbofan jet engine 10, also providing propulsive thrust.

Moreover, as is depicted schematically in the example of FIG. 1, the turbofan jet engine 10 further includes various accessory systems to aid in the operation of the turbofan jet engine 10 and/or an aircraft including the turbofan jet engine 10. For example, the exemplary turbofan engine 10 further includes a main lubrication system 78 configured to provide a lubricant to, e.g., various bearings and gear meshes in the compressor section (including the low pressure compressor 22 and high pressure compressor 24), the turbine section (including the high pressure turbine 28 and the low pressure turbine 30), the high pressure spool 34, the low pressure spool 36, and the power gear box 46. The lubricant provided by the main lubrication system 78 may increase the useful life of such components and may remove a certain amount of heat from such components. Additionally, the turbofan jet engine 10 includes a compressor cooling air (CCA) system 80 for providing air from one or both of the high pressure compressor 24 or low pressure compressor 22 to one or both of the high pressure turbine 28 or low pressure turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the turbofan jet engine 10 includes a generator lubrication system 84 for providing lubrication to an electronic generator, as well as cooling/heat removal for the electronic generator. The electronic generator may provide electrical power to, e.g., a startup electric motor for the turbofan jet engine 10 and/or various other electronic components of the turbofan jet engine 10 and/or an aircraft including the turbofan jet engine 10.

As is also depicted schematically, the turbofan jet engine 10 drives or enables various other accessory systems for an aircraft including the exemplary turbofan engine 10. For example, the turbofan jet engine 10 provides compressed air from the compressor section to an environmental control system (ECS) 86. The ECS 86 may provide an air supply to a cabin of the aircraft for pressurization and thermal control. Additionally, air may be provided from the turbofan jet engine 10 to an electronics cooling system 88 for maintaining a temperature of certain electronic components of the turbofan jet engine 10 and/or aircraft within a desired range.

It should be appreciated, however, that the turbofan jet engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan jet engine 10 may instead be any other suitable aeronautical gas turbine engine, such as a turbojet engine, turboshaft engine, turboprop engine, etc. Additionally, in still other exemplary embodiments, the turbofan jet engine 10 may include or be operably connected to any other suitable accessory systems. Additionally, or alternatively, the exemplary turbofan engine 10 may not include or be operably connected to one or more of the accessory systems discussed above.

Figure 2:
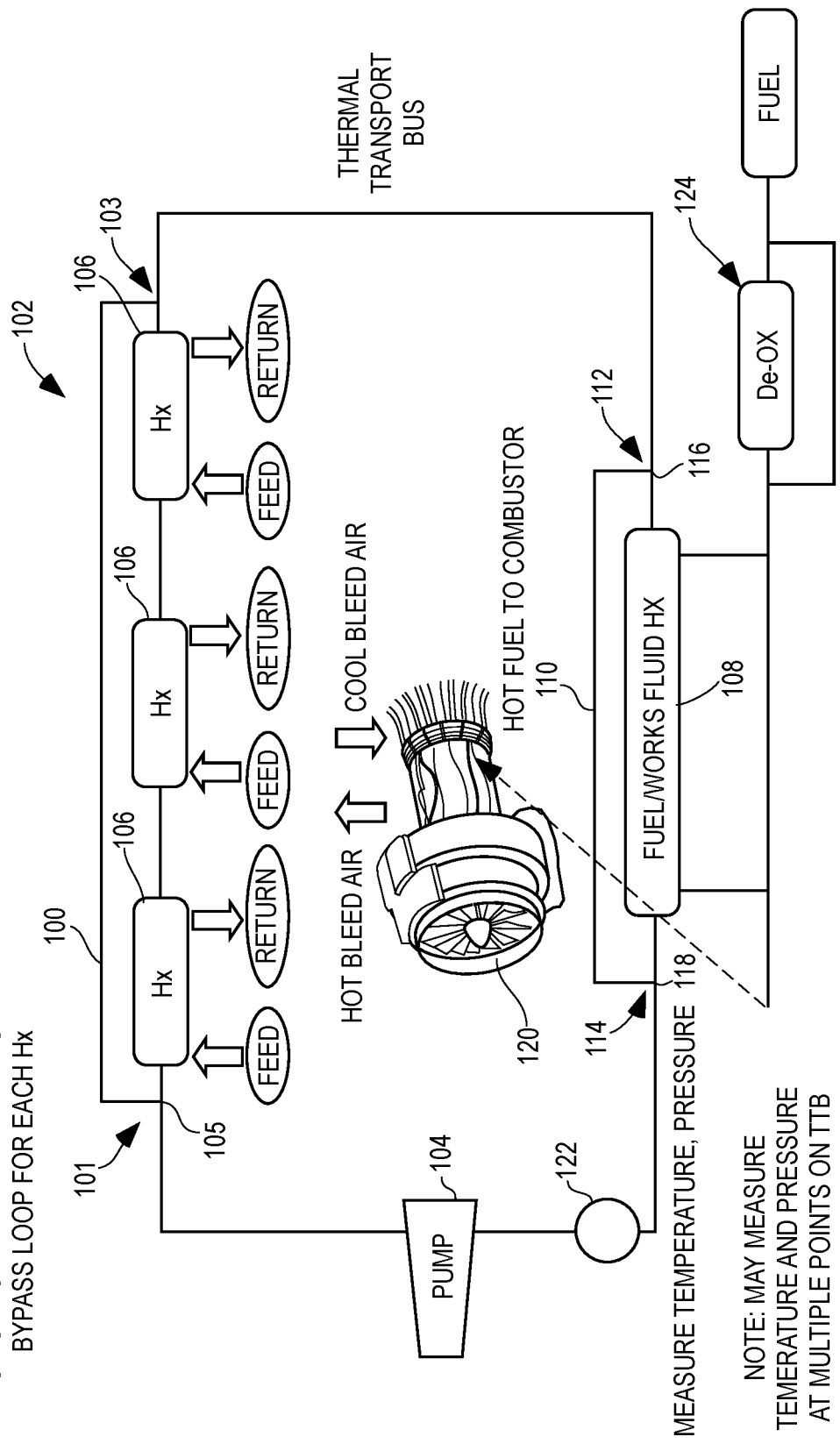
FIG. 2 comprises a schematic view as configured in accordance with variations of the present disclosure.

As shown in FIG. 2, a thermal transport bus 102 includes an intermediary heat exchange fluid flowing therethrough and may be formed of one or more suitable fluid conduits. The heat exchange fluid may be a compressible or an incompressible fluid having a high temperature operating range. For example, in certain embodiments, heat exchange fluid may be a water and ethanol mixture, or any suitable fluid, such as super critical $CO_2$. A pump 104 is provided in fluid communication with the heat exchange fluid in the thermal transport bus 102 for generating a flow of the heat exchange fluid in the thermal transport bus 102. As viewed in FIG. 2, the pump 104 may generate a flow of the heat exchange fluid generally in a clockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the high pressure spool 34 or the low pressure spool 36 of the turbofan jet engine 10.

Moreover, the exemplary thermal transport bus 102 includes a plurality of heat source exchangers 106 in thermal communication with the heat exchange fluid in the thermal transport bus 102. The plurality of heat source exchangers 106 are configured to transfer heat from the turbofan jet engine 10 to the heat exchange fluid in the thermal transport bus 102.

For the embodiment depicted, there are three heat source exchangers 106, the three heat source exchangers 106 each arranged in series flow along the thermal transport bus 102. However, in other exemplary embodiments, any other suitable number of heat source exchangers 106 may be included and one or more of the heat source exchangers 106 may be arranged in parallel flow along the thermal transport bus 102. For example, in other embodiments, there may only be at least two heat source exchangers 106 in thermal communication with the heat exchange fluid in the thermal transport bus 102, or alternatively, there may be at least four heat source exchangers 106, at least five heat source exchangers 106, or at least six heat source exchangers 106 in thermal communication with heat exchange fluid in the thermal transport bus 102.

The plurality of heat source exchangers 106 depicted are selectively in thermal communication with the heat exchange fluid in the thermal transport bus 102. More particularly, the thermal transport bus 102 depicted includes a plurality of bypass lines 100 for selectively bypassing each of the plurality of heat sink exchangers 106 (or more than one, or all of the plurality of heat source exchangers 106). Each of the bypass lines 100 extends between an upstream juncture 101 and a downstream juncture 103—the upstream juncture 101 located just upstream of a respective heat source exchanger 106, and the downstream juncture 103 located just downstream of the respective heat source exchanger 106. Additionally, each of the bypass lines 100 meets at the respective upstream juncture 101 with the thermal transport bus 102 via a three-way heat source valve 105. The three-way heat source valves 105 each include an inlet fluidly connected with the thermal transport bus 102, a first outlet fluidly connected with the thermal transport bus 102, and a second outlet fluidly connected with the bypass line 100. The three-way heat source valves 105 may each be a variable throughput three-way valve, such that the three-way heat source valves 105 may vary a throughput from the inlet to the first and/or second outlets. For example, the three-way heat source valves 105 may be configured for providing anywhere between zero percent (0%) and one hundred percent (100%) of the heat exchange fluid from the inlet to the first outlet, and similarly, the three-way heat source valves 105 may be configured for providing anywhere between zero percent (0%) and one hundred percent (100%) of the heat exchange fluid from the inlet to the second outlet.

Additionally, the exemplary thermal transport bus 102 of FIG. 2 further includes at least one heat sink exchanger 108 permanently or selectively in thermal communication with the heat exchange fluid in the thermal transport bus 102. The at least one heat sink exchanger 108 is located downstream of the plurality of heat source exchangers 106 and is configured for transferring heat from the heat exchange fluid in the thermal transport bus 102, e.g., to atmosphere, to fuel, to a fan stream, etc. For example, in certain embodiments the at least one heat sink exchanger 108 may include at least one of a ram heat exchanger, a fuel heat exchanger, a fan stream heat exchanger, or a bleed air heat exchanger. The ram heat exchanger may be configured as an "air to heat exchange fluid" heat exchanger integrated into one or both of the turbofan jet engine 10 or an aircraft including the turbofan jet engine 10. During operation, the ram heat exchanger may remove heat from any heat exchange fluid therein by flowing a certain amount of ram air over the ram heat exchanger. Additionally, the fuel heat exchanger is a "fluid to heat exchange fluid" heat exchanger wherein heat from the heat exchange fluid is transferred to a stream of liquid fuel for the turbofan jet engine 10. Moreover, the fan stream heat exchanger is generally an "air to heat exchange fluid" heat exchanger which flows, e.g., bypass air over heat exchange fluid to remove heat from the heat exchange fluid. Further, the bleed air heat exchanger is generally an "air to heat exchange fluid" heat exchanger which flows, e.g., bleed air from the LP compressor overheat exchange fluid to remove heat from the heat exchange fluid.

For the embodiment of FIG. 2, the at least one heat sink exchanger 108 of the thermal transport bus 102 depicted includes an individual heat sink exchanger 108 serving as a fuel heat exchanger. However, in other exemplary embodiments, the at least one heat sink exchanger 108 may include any other suitable number of heat sink exchangers 108. For example, in other exemplary embodiments, a single heat sink exchanger 108 may be provided, at least two heat sink exchangers 108 may be provided, at least four heat sink exchangers 108 may be provided, or at least five heat sink exchangers 108 may be provided. Additionally, in still other exemplary embodiments, two or more of the at least one heat sink exchangers 108 may alternatively be arranged in parallel flow with one another.

The at least one heat sink exchangers 108 depicted are selectively in thermal communication with the heat exchange fluid in the thermal transport bus 102. More particularly, the thermal transport bus 102 depicted includes one or more bypass lines 110 for selectively bypassing each heat sink exchanger 108 in the plurality of heat sink exchangers 108. Each of the bypass lines 110 extends between an upstream juncture 112 and a downstream juncture 114—the upstream juncture 112 located just upstream of a respective heat sink exchanger 108, and the downstream juncture 114 located just downstream of the respective heat sink exchanger 108. Additionally, each of the bypass lines 110 meets at the respective upstream juncture 112 with the thermal transport bus 102 via a three-way heat sink valve 116. The three-way heat sink valves 116 each include an inlet fluidly connected with the thermal transport bus 102, a first outlet fluidly connected with the thermal transport bus 102, and a second outlet fluidly connected with the bypass lines 110. The three-way heat sink valves 116 may each be a variable throughput three-way valve, such that the three-way heat sink valves 116 may vary a throughput from the inlet to the first and/or second outlets. For example, the three-way heat sink valves 116 may be configured for providing anywhere between zero percent (0%) and one hundred percent (100%) of the heat exchange fluid from the inlet to the first outlet, and similarly, the three-way heat sink valves 116 may be configured for providing anywhere between zero percent (0%) and one hundred percent (100%) of the heat exchange fluid from the inlet to the second outlet.

Notably, the three-way heat sink valves 116 may be in operable communication with a controller of the turbofan jet engine 10 and/or of an aircraft including the turbofan jet engine 10. The controller may bypass one or more of the at least one heat sink exchangers 108 based on, e.g., an operating condition of the turbofan jet engine 10 and/or aircraft, a temperature of the heat exchange fluid, and/or any other suitable variables. Alternatively, the controller may bypass one or more of the at least one heat sink exchangers 108 based on a user input.

Further, each of the bypass lines 110 also meets at the respective downstream juncture 114 with the thermal transport bus 102. Between each heat sink exchanger 108 and downstream juncture 114, the thermal transport bus 102 includes a check valve 118 for ensuring a proper flow direction of the heat exchange fluid. More particularly, the check valve 118 prevents a flow of heat exchange fluid from the downstream juncture 114 towards the respective heat sink exchanger 108.

Notably, such a configuration may allow for utilization of the fuel heat exchanger without risk of heating the fuel to a point where de-oxygenation systems (such as the de-oxygenation system 124 illustrated by way of example in FIG. 2) are required to be included. For example, prior fuel heat exchangers run the risk of fuel coking or deposit formation within the fuel system when a temperature of the fuel is increased past a predetermined temperature threshold (thus requiring the de-oxygenation systems). Due to the redundant and selective configuration of the various heat sink exchangers 106 for the embodiment depicted in the example of FIG. 2, however, utilization of the fuel heat exchanger may be ceased such that the fuel does not exceed a predetermined temperature threshold. In this way, in some applications, the fuel heat exchanger can be controlled in order to manipulate heat transfer to avoid fuel boiling.

It should be appreciated, however, that the thermal transport bus 102 is provided by way of example only, and that in other exemplary embodiments, the thermal transport bus 102 may be configured in any other suitable manner.

A thermal transport bus 102, in accordance with an exemplary embodiment of the present disclosure, may allow for a gas turbine engine and aircraft including such a gas turbine engine to operate more efficiently. More particularly, inclusion of a thermal transport bus 102 in accordance with an exemplary embodiment of the present disclosure may allow for a reduction in volume of a core of the gas turbine engine as less heat exchangers and/or smaller heat exchangers may be required to maintain a desired amount of heat removal. Additionally, the heat removed using a thermal transport bus 102 in accordance with an exemplary embodiment of the present disclosure may allow for redirection of such heat to one or more accessory systems that require heat to operate. Advantageously, the thermal transport bus 102 can help the engine cycle to be more efficient (i.e., the fuel required to provide a certain amount of thrust can be reduced). Additionally, transient control of the thermal transport bus 102 allows for temperature modulation to meet desired cooling or heating of multiple components.

Figure 3:
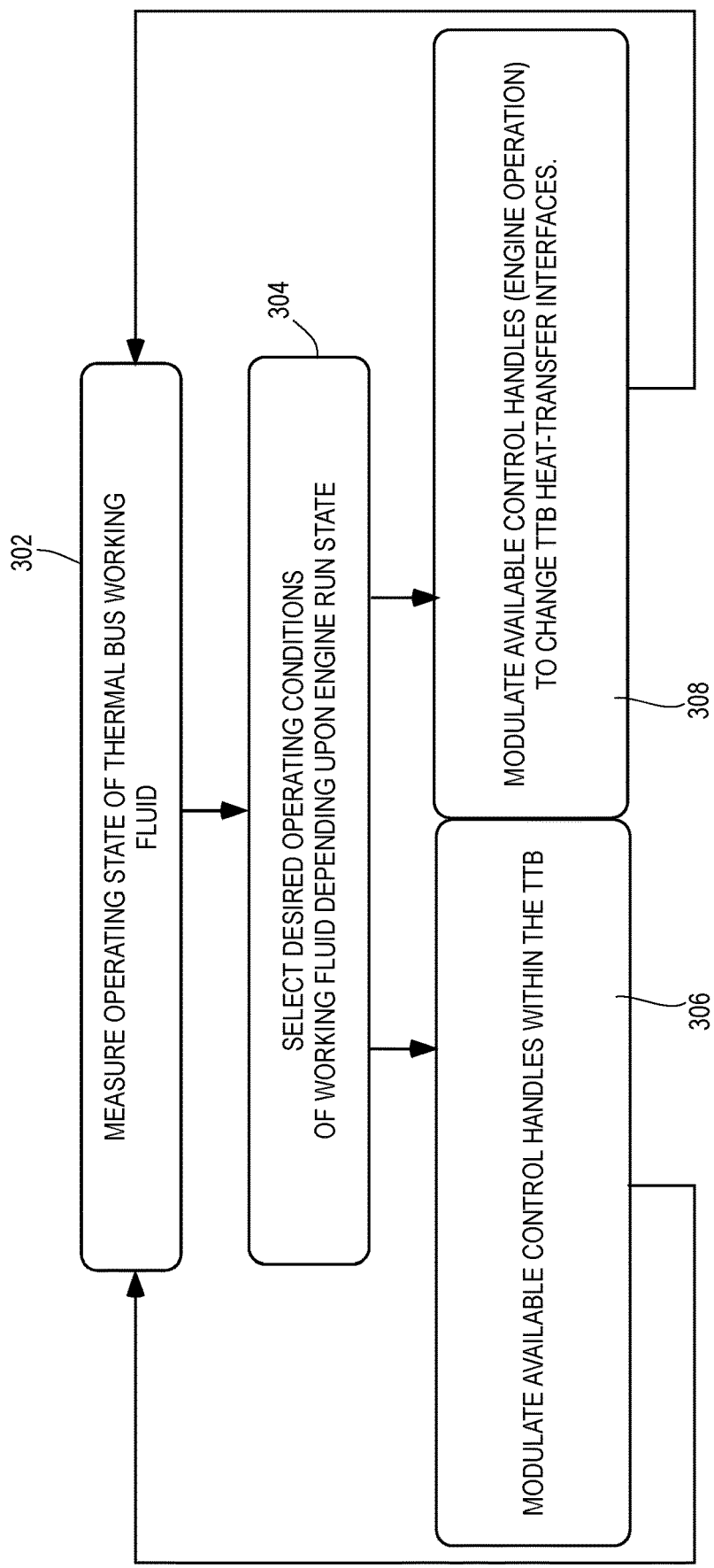
FIG. 3 comprises a flow diagram as configured in accordance with variations of the present disclosure.

Referring to FIG. 3, a flow diagram illustrates operation of a system and method for transient control of a thermal transport bus, for example the thermal transport bus 102 as illustrated in FIG. 2, in accordance with the present disclosure. At the outset, at step 302, an operating state of the thermal transport bus working fluid is measured. The operating state, may include, for example, pressure, temperature, or flow rate, or combinations thereof. The operating sate may be measured at various points on the thermal transport bus, or at a single point on the thermal transport bus, such as by a pressure, temperature, or flow rate sensor, for example the temperature and pressure sensor 122 of FIG. 2.

Next, at step 304, desired operating conditions (e.g., temperature, pressure, flow rate . . . ) of the working fluid are selected as a function of the engine run state (for example, start up, shut down, cruise, high power, etc.). The desired operating conditions for a given operating state, as well as the types of operating states will vary depending on the specific thermal transport bus used, e.g., size and configuration, the working fluid used, and the turbomachine, gas turbine engine, with which the thermal transport bus is used.

Next, at step 306, available control handles (e.g., the working fluid pump speed, pump inlet guide vanes, bypass valves for each heat source exchanger, and bypass valves for each heat sink exchanger) within the thermal transport bus are modulated to manipulate working fluid properties for desired fluid state. For example, the pump 104, three-way heat source valve 105, and the three-way heat sync valve 116 of FIG. 2 may be modulated to manipulate working fluid properties.

Also following step 304, and in parallel with step 306, at step 308, available control handles (engine operation) to change thermal transport bus heat-transfer interfaces (e.g., amount of cooling air flow, amount of fuel flow, etc.) are modulated in coordination with the modulation of the available control handled within the thermal transport bus in step 306, to manipulate working fluid properties for desired fluid state. For example, available control handles can include varying fan pitch scheduling, varying variable engine geometry scheduling, as well as adjusting inlet and bypass stream guide vanes to direct cooling air into or around heat exchangers that interface with the thermal transport bus and the engine flow, varying speed of the fan and of the core, to alter flow into these types of heat exchangers, combinations of these control handles, and the like, depending on the control handles implemented in a particular engine.

Following steps 306 and 308, the system and method loop back to step 302, and continue looping through steps 302, 304, 306, and 308 until operation ceases, e.g., when the turbofan jet engine is finished shutting down.

The one or more of the teachings illustrated in FIG. 3 or described in the accompanying description may be used in various combinations with the subject matter described in one of more of FIGS. 1 and 2.

Figure 4:
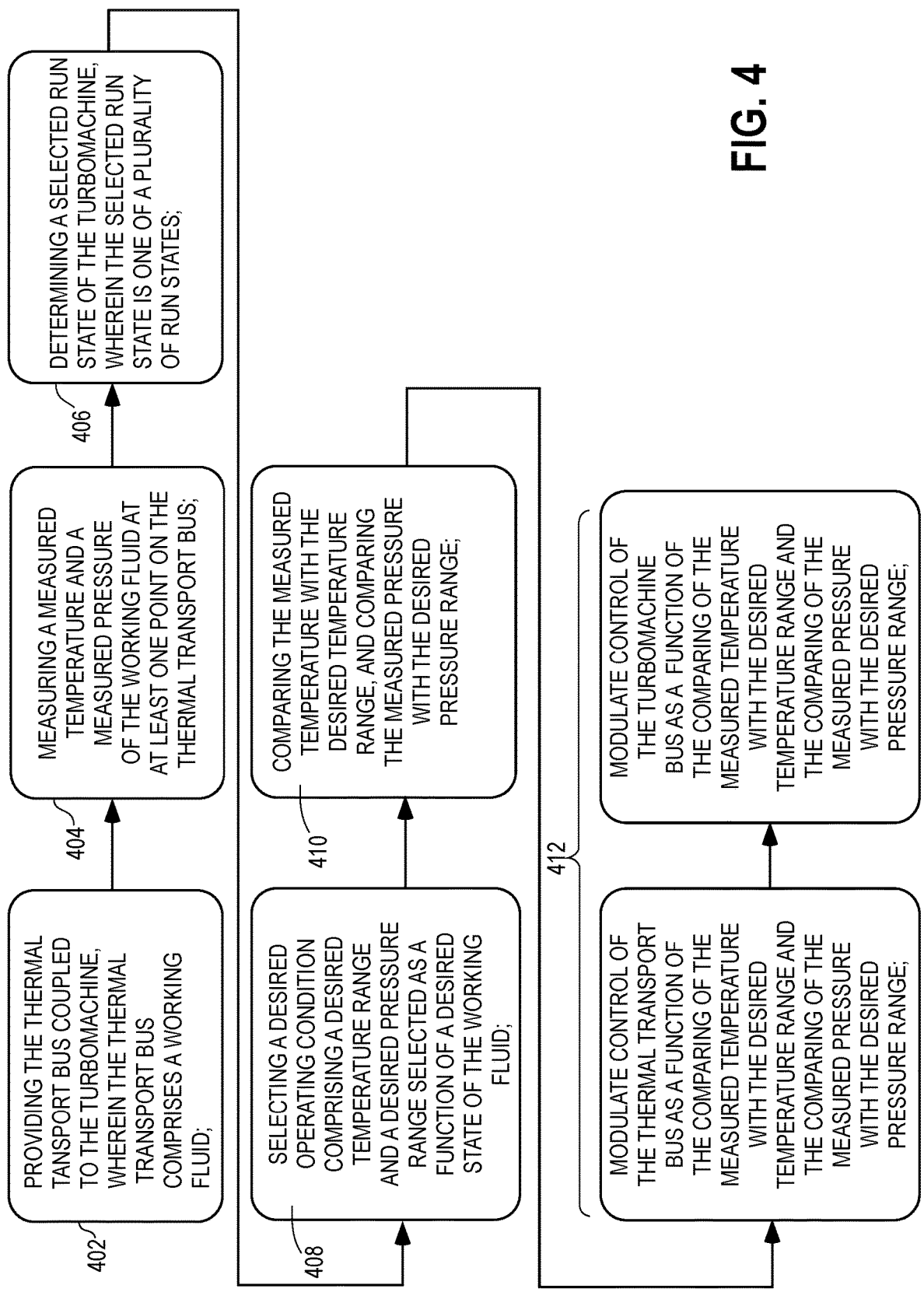
FIG. 4 comprises a flow diagram as configured in accordance with variations of the present disclosure.

Referring to FIG. 4, a flowchart is shown of a method of transient control of the thermal transport bus. One suitable thermal transport bus 102 is illustrated in FIG. 2.

Initially, in step 402, a thermal transport bus is coupled to a turbomachine. The thermal transport bus contains a working fluid that is circulated through the thermal transport bus by a pump. One suitable pump 104 is illustrated in FIG. 2.

Next, in step 404, a measured temperature of the working fluid is measured, and a measured pressure of the working fluid is measured at at least one point on the thermal transport bus. One suitable temperature and pressure sensor 122 is illustrated in FIG. 2.

Next, in step 406, a selected run state of the turbomachine is determined. The selected run state is one of a plurality of run states for the turbomachine.

Next, in step 408, a desired operating condition comprising a desired temperature range and a desired pressure range is selected as a function of a desired state of the working fluid. The desired operating condition may also or in addition be selected as a function of the determined run state of the turbomachine. Such determination can be made, for example using a processor performing such determination under the control of a code segment, or for example using appropriate conditional logic implemented using a controller comprising a programmable controller or hardware logic devices, such as an application specific integrated circuit or discrete hardware logic devices or switches.

Next, in step 410, the measured temperature is compared with the desired temperature range, and the measured pressure is compared with the desired pressure range. Such comparison can be made, for example, using the desired temperature range, the desired pressure range, the measured temperature, and the measured pressure as inputs and using a processor performing such determination under the control of a code segment, or for example using appropriate conditional logic implemented using a controller comprising a programmable controller or hardware logic devices, such as an application specific integrated circuit or discrete hardware logic devices or switches.

Finally, in step 412, control of the thermal transport bus is modulated as a function of the comparing of the measured temperature with the desired temperature range and the comparing of the measured pressure with the desired pressure range. This modulating may include adjusting a speed of a pump, adjusting one or more bypass valves in a heat source exchanger, adjusting one or more bypass valves in a heat sink exchanger or combinations of two or more of the forgoing. One suitable pump 104, one suitable bypass value in a heat source exchanger, i.e., the three-way heat source valve 105, and one suitable bypass valve in a heat sink exchanger, i.e., the three-way heat sink valve 116, is illustrated in FIG. 2.

The one or more of the teachings illustrated in FIG. 4 or described in the accompanying description may be used in various combinations with the subject matter described in one or more of FIGS. 1, 2 and 3.

Figure 5:
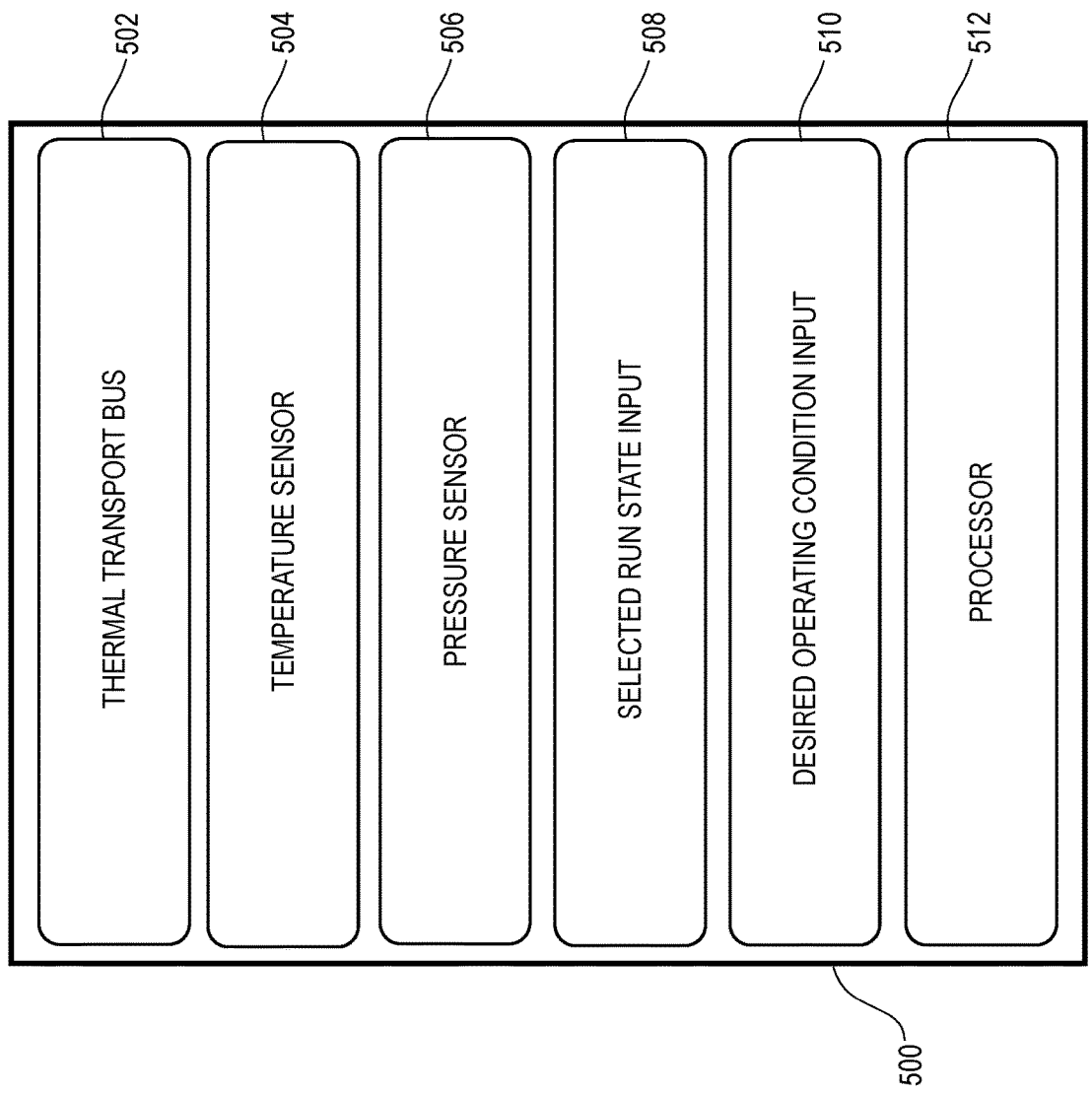
FIG. 5 comprises a block diagram as configured in accordance with variations of the present disclosure.

Referring to FIG. 5, a block diagram is shown of a system for transient control of the thermal transport bus 500. The system includes the thermal transport bus 502, which includes a working fluid circulating through the thermal transport bus; a temperature sensor 504 that generates a temperature output signal; a pressure sensor 506 that generates a pressure output signal; a selected run state input 508 receiving a selected run state signal in which a selected run state is one of a plurality of run states; a desired operating condition input 510 receiving a desired temperature range signal and a desired pressure range signal selected as a function of a desired state of the working fluid; a processor 512 coupled to the select run state input 508 and the desired operating condition input and generating a thermal transport bus control signal by performing the following steps: comparing the temperature output signal with the desired temperature range signal, and comparing the pressure output signal with the desired pressure range signal; and generate the thermal transport bus control signal as a function of the comparing of the temperature output signal with the desired temperature range signal and the comparing of the pressure output signal with the desired pressure range signal. The processor performing such steps may be, for example, a processor performing such steps under the control of a code segment, or for example using appropriate conditional logic implemented using a controller comprising a programmable controller or hardware logic devices, such as an application specific integrated circuit or discrete hardware logic devices or switches.

In one variation of the system 500, the desired operating condition input may be generated as a function of a desired state of the working fluid and said selected run state.

In another variation, which may be a separate variation or combined with the one variation above, the processor 512 may generate a turbomachine control signal, by performing the following additional step: generating the turbomachine control signal as a function of the comparing of the temperature output signal with the desired temperature range signal and the comparing the pressure output signal with the desired pressure range signal. The processor performing such step may be, for example, a processor performing such step under the control of a code segment, or for example using appropriate conditional logic implemented using a controller comprising a programmable controller or hardware logic devices, such as an application specific integrated circuit or discrete hardware logic devices or switches.

The one or more of the teachings illustrated in FIG. 5 or described in the accompanying description may be used in various combinations with the subject matter described in one or more of FIGS. 1, 2, 3 and 4.

Figure 6:
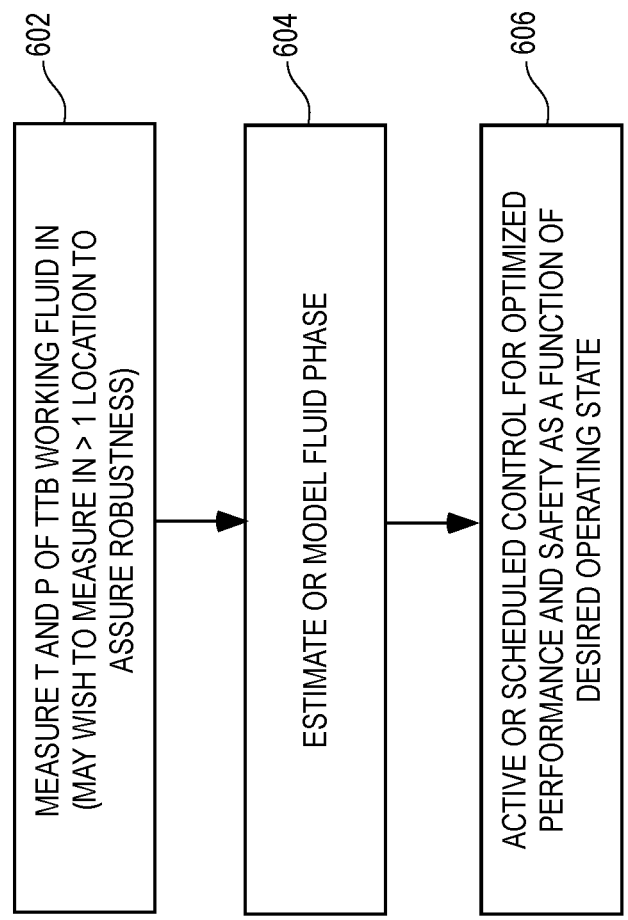
FIG. 6 comprises a flow diagram as configured in accordance with variations of the present disclosure.

Referring to FIG. 6, a flow chart is shown of a method for transient control of a thermal transport bus.

In step 602, pressure and temperature of a working fluid of the thermal transport bus are measured in at least one location along the fluid path of the working fluid through the thermal transport bus. The temperature and pressure can, in one example, be measured by the temperature and pressure sensor 122 of FIG. 2.

In step 604, the phase of the working fluid is estimated based on a model of the phase of the working fluid. The model may be generated experimentally or computationally.

In step 606, active or scheduled control of the thermal transport bus is effected based on the determined phase, for optimized performance and safety as a function of desired phase of the working fluid. Active or scheduled control of the thermal transport bus can by way of example by effected by controlling the pump 104, the three-way heat source valve 105, and the three-way heat sink valve 116 illustrated in FIG. 2.

The one or more of the teachings illustrated in FIG. 6 or described in the accompanying description may be used in various combinations with the subject matter described in one or more of FIGS. 1, 2, 3, 4 and 5.

Figure 7:
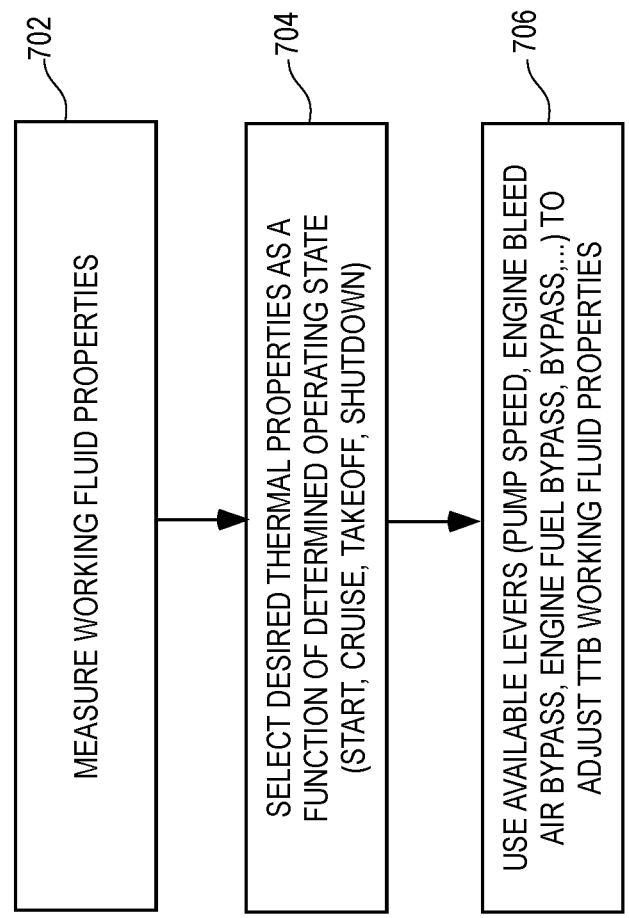
FIG. 7 comprises a flow diagram as configured in accordance with variations of the present disclosure.

Referring to FIG. 7, a flow chart is shown of a method for transient control of a thermal transport bus.

In step 702, temperature of a working fluid of the thermal transport bus is measured in at least one location along the fluid path of the working fluid through the thermal transport bus. The temperature, in one example, be measured by the temperature and pressure sensor 122 of FIG. 2.

In step 704, selected thermal properties of the working fluid are selected based on the run state (for example, start, cruise, takeoff, or shutdown) of the turbomachine. These selected thermal properties may be selected using, for example, a model, for example a model determined experimentally or computationally for the particular turbomachine type model, type or version with which the thermal transport bus is employed.

In step 706, available control handles, or levers, (for example, pump speed, engine bleed air bypass (cooling flow), engine fuel bypass, and the like) of the turbomachine are used to adjust thermal transport bus working fluid properties for a desired working fluid state.

The one or more of the teachings illustrated in FIG. 7 or described in the accompanying description may be used in various combinations with the subject matter described in one or more of FIGS. 1, 2, 3, 4, 5 and 6.

In an OFF operating mode, the pump is stopped (i.e., 0 rpm), thermal transport bus working fluid temperature is below a threshold temperature, and thermal transport bus pressure is below a threshold pressure for the turbomachine fuel after thermal soakback.

From the OFF operating mode, in the event the working fluid is in an expected state (temperature and pressure); and there is no pump/controller fault is detected, the process can move to a START UP operating mode.

In the START UP operating mode, the pump is started up following a startup profile (startup characteristics can be tailored due to the pump being an electric pump), and the working fluid pressurizes and heats up to a supercritical state for the turbomachine fuel using hot engine air from the turbomachine.

From the START UP operating mode, in the event the working fluid is pressurizing/heating as expected, the pump is starting up normally, and all valves and sensors operate as expected, the process can move to a RUNNING operating mode. However, from the startup operating mode, in the event a pump fault, certain sensor/valve faults, or an abnormal work fluid state is sensed, the process will instead move to a SHUTDOWN operating mode.

In the RUNNING operating mode, the pump is at operating speed, and the thermal transport bus working fluid temperature is at or above the threshold temperature, and the thermal transport bus working fluid pressure is above the threshold pressure needed to maintain the turbomachine fuel in the supercritical state. Pump speed and bypass valve control for the thermal transport bus are selected based on power management of the turbomachine received via an electronic engine control. One suitable pump 104, one suitable bypass value in a heat source exchanger, i.e., the three-way heat source valve 105, and one suitable bypass valve in a heat sink exchanger, i.e., the three-way heat sink valve 116, is illustrated in FIG. 2.

From the RUNNING operating mode, when the electronic engine control of the turbomachine commands a shutdown, or a failure condition is detected causing shutdown, the process will instead move to the SHUTDOWN operating mode.

In the SHUTDOWN operating mode, the pump spools down following a spool down profile, and the bypass valves move to a shutdown position.

The one or more of the teachings relating to the OFF, START UP, RUNNING, and SHUTDOWN operating modes may be used in various combinations with the subject matter described in one or more of FIGS. 1, 2, 3, 4, 5, 6 and 7.

In FIG. 8, a graphical representation is shown over time, of exhaust gas temperature 802, engine compressor temperature 804, and engine speed 806 of the turbofan jet engine pressure 808 and temperature 810 of the working fluid in the thermal transport bus, and a control input 812 to the thermal transport bus pump.

At the far left time 814 of the graphical representation, the thermal transport bus pump is turned on, which increases the pressure of the working fluid, and the temperature of the working fluid increased due to the increase in pressure. Then, at a fuel on time 816, which occurs when engine control logic has determined its present conditions are suitable for fuel introduction, fuel is flowed to the turbomachine, resulting in a sharp increase in the exhaust gas temperature 804, and the engine compressor temperature 804. Engine speed 806 also increases as fuel is supplied to the turbomachine. In turn, the increased temperatures resulting from the fuel combusting in the turbomachine is harvested as heat by the thermal transport bus (through the heat source exchangers) to add heat to the fuel (through the heat sink exchangers) as it is supplied to the turbomachine until sufficient heat is added to the fuel for the fuel to reach a critical point 818, at which time the fuel becomes supercritical. As the critical point 818 is approached, the thermal transport pump speed is modulated and/or bypass valves in the heat source exchangers and/or heat sink exchangers are modulated in order to maintain the fuel in the supercritical state.

The one of more of the teachings illustrated in FIG. 8 or described in the accompanying description may be used in various combinations with the subject matter described in one of more of FIGS. 1, 2, 3, 4, 5, 6, and 7, and the above-described operating modes.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the inventive concept. Further aspects of the present disclosure are provided by the subject matter of the following clauses:

Example 1 includes a method of transient control of a thermal transport bus of a turbomachine comprising: measuring a measured temperature and a measured pressure of a working fluid at at least one point on the thermal transport bus; determining a selected run state of a turbomachine, wherein the selected run state is one of a plurality of run states; selecting a desired operating condition comprising a desired temperature range and a desired pressure range as a function of a desired state of the working fluid; comparing the measured temperature with the desired temperature range, and comparing the measured pressure with the desired pressure range; and modulating control of the thermal transport bus as a function of the comparing of the measured temperature with the desired temperature range and the comparing of the measured pressure with the desired pressure range.

Example 2 includes the method of any preceding clause wherein the selecting the desired operating condition further comprises selecting the desired operating condition comprising the desired temperature range and the desired pressure range selected as a function of the desired state of the working fluid and the selected run state.

Example 3 includes the method of any preceding clause further comprising: modulating control of the turbomachine as a function of the comparing of the measured temperature with the desired temperature range and the comparing of the measured pressure with the desired pressure range.

Example 4 includes the method of any preceding clause wherein the providing of the thermal transport bus coupled to the turbomachine comprises providing the thermal transport bus coupled to an aircraft engine.

Example 5 includes the method of any preceding clause wherein the providing of the thermal transport bus comprises providing of the thermal transport bus comprising a pump, and wherein the modulating control of the thermal transport bus comprises the modulating control of the pump.

Example 6 includes the method of any preceding clause wherein the providing of the thermal transport bus comprises providing of the thermal transport bus comprising a plurality of heat exchangers, and wherein the modulating control of the thermal transport bus comprises directing the working fluid through one or more of the plurality of heat exchangers.

Example 7 includes the method of any preceding clause wherein the selecting the desired operating condition comprising the desired temperature range and the desired pressure range as the function of the desired state for the working fluid, wherein the selecting is adapted to avoid coking of a fuel combusted in the turbomachine.

Example 8 includes the method of any preceding clause wherein the selecting the desired operating condition comprising the desired temperature range and the desired pressure range as the function of the desired state for the working fluid, wherein the selecting is adapted to avoid exceeding temperature limits for the turbomachine.

Example 9 includes the method of any preceding clause wherein the selecting the desired operating condition comprising the desired temperature range and the desired pressure range as the function of the desired state for the working fluid, wherein the selecting is adapted to avoid exceeding temperature limits for the working fluid at another point in the turbomachine.

Example 10 includes the method of any preceding clause wherein the selecting the desired operating condition comprising the desired temperature range and the desired pressure range as the function of the desired state for the working fluid, wherein the selecting is adapted to avoid exceeding temperature limits at another point in the turbomachine.

Example 11 includes the method of any preceding clause wherein the providing of the thermal transport bus comprises providing of the thermal transport bus comprising a pump, and wherein the selecting the desired operating condition comprising the desired temperature range and the desired pressure range as the function of the desired state for the working fluid, wherein the selecting is adapted to maintain an operating state of the working fluid in the pump.

Example 12 includes a system of transient control of a thermal transport bus of a turbomachine comprising: the thermal transport bus, wherein the thermal transport bus comprises a working fluid; a temperature sensor comprising a temperature output signal; a pressure sensor comprising a pressure output signal; a selected run state input comprising a selected run state signal, wherein a selected run state is one of a plurality of run states; a desired operating condition input comprising a desired temperature range signal and a desired pressure range signal selected as a function of a desired state of the working fluid; a processor generating a thermal transport bus control signal by performing the following steps: comparing the temperature output signal with the desired temperature range signal, and comparing the pressure output signal with the desired pressure range signal; and generating the thermal transport bus control signal as a function of the comparing of the temperature output signal with the desired temperature range signal and the comparing of the pressure output signal with the desired pressure range signal. The processor performing such steps may be, for example, a processor performing such steps under the control of a code segment, or for example using appropriate conditional logic implemented using a controller comprising a programmable controller or hardware logic devices, such as an application specific integrated circuit or discrete hardware logic devices or switches.

Example 13 includes the system of any preceding clause wherein the desired operating condition input comprising the desired temperature range signal and the desired pressure range signal are a function of the desired state of the working fluid and the selected run state.

Example 14 includes the system of any preceding clause further comprising: the processor generating the thermal transport bus control signal, and a turbomachine control signal, by performing the following additional step: generate the turbomachine control signal as a function of the comparing of the temperature output signal with the desired temperature range signal and the comparing of the pressure output signal with the desired pressure range signal.

Example 15 includes the system of any preceding clause wherein the turbomachine is an aircraft engine.

Example 16 includes the system of any preceding clause wherein the thermal transport bus comprises a pump, and wherein the thermal transport bus control signal controls the pump.

Example 17 includes the system of any preceding clause wherein the thermal transport bus comprises a plurality of heat exchangers, and wherein the thermal transport bus control signal controls directing the working fluid through one or more of the plurality of heat exchangers.

Example 18 includes the system of any preceding clause wherein the desired temperature range signal and the desired pressure range signal are adapted to avoid coking of a fuel combusted in the turbomachine.

Example 19 includes the system of any preceding clause wherein the desired temperature range signal and the desired pressure range signal are adapted to avoid exceeding temperature limits for the turbomachine.

Example 20 includes the system of any preceding clause wherein the thermal transport bus comprises a pump, and wherein the desired temperature range signal and the desired pressure range signal are adapted to maintain an operating state of the working fluid in the pump.

What is claimed is:

1. A system of transient control of a thermal transport bus of a turbomachine comprising:
   a turbomachine operable in a plurality of run states;
   a thermal transport bus of the turbomachine, wherein the thermal transport bus comprises a working fluid;
   a processor;
   a temperature sensor that sends a temperature output signal to the processor;
   a pressure sensor that sends a pressure output signal to the processor;
   wherein the processor directs modulation of thermal transport bus control handles and turbomachine control handles to bring the working fluid into a desired fluid state by:
      determining the desired fluid state to bring the working fluid into based on a selected run state signal, the selected run state signal indicating a current one of the plurality of run states in which the turbomachine is operating;
      comparing the temperature output signal with a desired temperature range signal, the desired temperature range signal corresponding to the desired fluid state;
      comparing the pressure output signal with a desired pressure range signal, the desired pressure range signal corresponding to the desired fluid state;
      generating a thermal transport bus control signal and a turbomachine control signal as a function of the comparing of the temperature output signal with the desired temperature range signal and the comparing of the pressure output signal with the desired pressure range signal;
      sending the thermal transport bus control signal to the thermal transport bus control handles; and
      sending the turbomachine control signal to the turbomachine control handles.

2. The system of claim 1 wherein said turbomachine is an aircraft engine.

3. The system of claim 1 wherein said thermal transport bus control handles include a pump, and wherein said thermal transport bus control signal directs the pump to modulate a speed thereof to bring the working fluid into the desired fluid state.

4. The system of claim 1 wherein said thermal transport bus control handles include bypass values for a plurality of heat exchangers, and wherein said thermal transport bus control signal directs the bypass values to modify which ones of the plurality of heat exchangers the working fluid is flowing through to bring the working fluid into the desired fluid state.

5. The system of claim 1 wherein said desired temperature range signal and said desired pressure range signal are indicative of ranges of temperature and pressure values for the working fluid that are adapted to avoid coking of a fuel combusted in the turbomachine when operating in the current one of the plurality of run states indicated by the selected run state signal.

6. The system of claim 1 wherein said desired temperature range signal and said desired pressure range signal are indicative of ranges of temperature and pressure values for the working fluid that are adapted to avoid exceeding temperature limits for said turbomachine when operating in the current one of the plurality of run states indicated by the selected run state signal.

7. The system of claim 1 wherein said thermal transport bus comprises a pump, and wherein said desired temperature range signal and said desired pressure range signal are indicative of ranges of temperature and pressure values for the working fluid that are adapted to maintain an operating state of the working fluid in said pump.

8. The system of claim 1 wherein the plurality of run states include a start up operation of the turbomachine, a shutdown operation of the turbomachine, a cruising operation of the turbomachine, and a high power operation of the turbomachine.

9. The system of claim 1 wherein each of the plurality of run states are associated with a different respective load condition of the turbomachine.

10. The system of claim 1 wherein each of the plurality of run states are associated with a different respective thrust output demand for the turbomachine.

11. A method of transient control of a thermal transport bus of a turbomachine comprising:
measuring a measured temperature and a measured pressure of a working fluid at at least one point on the thermal transport bus;
determining a selected run state of the turbomachine, wherein the selected run state is a current one of a plurality of run states in which the turbomachine is operating;
determining a desired fluid state to bring the working fluid into based on the selected run state of the turbomachine;
selecting a desired temperature range and a desired pressure range for the working fluid that correspond to the a desired fluid state;
comparing the measured temperature with the desired temperature range, and comparing the measured pressure with the desired pressure range; and
modulating thermal transport bus control handles and turbomachine control handles as a function of the comparing of the measured temperature with the desired temperature range and the comparing of the measured pressure with the desired pressure range to bring the working fluid into the desired fluid state.

12. The method of claim 11 wherein said turbomachine comprises an aircraft engine.

13. The method of claim 10 wherein said thermal transport bus control handles include a pump, and wherein said modulating of the thermal transport bus control handles comprises modulating a speed of the pump to bring the working fluid into the desired fluid state.

14. The method of claim 11 wherein said thermal transport bus control handles include bypass values for a plurality of heat exchangers, and wherein said modulating of the thermal transport bus control handles comprises directing the bypass values to modify which ones of the plurality of heat exchangers the working fluid is flowing through to bring the working fluid into the desired fluid state.

15. The method of claim 11 wherein said desired temperature range and said desired pressure range are indicative of ranges of temperature and pressure values for the working fluid that are adapted to avoid coking of a fuel combusted in the turbomachine when operating in the current one of the plurality of run states.

16. The method of claim 11 wherein said desired temperature range and said desired pressure range are indicative of ranges of temperature and pressure values for the working fluid that are adapted to avoid exceeding temperature limits for said turbomachine when operating in the current one of the plurality of run states.

17. The method of claim 11 wherein said thermal transport bus comprising a pump, and wherein said desired temperature range and said desired pressure range are indicative of ranges of temperature and pressure values for the working fluid that are adapted to maintain an operating state of the working fluid in said pump.

18. The method of claim 11 wherein the plurality of run states include a start-up operation of the turbomachine, a shutdown operation of the turbomachine, a cruising operation of the turbomachine, and a high power operation of the turbomachine.

19. The method of claim 11 wherein each of the plurality of run states are associated with a different respective load condition of the turbomachine.

20. The method of claim 11 wherein each of the plurality of run states are associated with a different respective thrust output demand for the turbomachine.

* * * * *

UNITED STATES PATENT AND TRADEMARK OFFICE
CERTIFICATE OF CORRECTION

| | | |
|---|---|---|
| PATENT NO. | : 11,946,378 B2 | |
| APPLICATION NO. | : 17/719379 | |
| DATED | : April 2, 2024 | |
| INVENTOR(S) | : Westervelt et al. | |

It is certified that error appears in the above-identified patent and that said Letters Patent is hereby corrected as shown below:

In the Claims

In Column 18, Claim 13, Line 6, delete "claim 10" and insert -- claim 11 --, therefor.

Signed and Sealed this
Twenty-fifth Day of June, 2024

*Katherine Kelly Vidal*

Katherine Kelly Vidal
*Director of the United States Patent and Trademark Office*